United States Patent Office 3,333,027
Patented July 25, 1967

3,333,027
CHLORINE AND/OR BROMINE PHOSPHATES
AND THIOPHOSPHATES
Millard S. Larrison, Livingston, N.J., assignor to Weston Chemical Corporation, Newark, N.J., a corporation of New Jersey
No Drawing. Filed Sept. 23, 1964, Ser. No. 398,754
21 Claims. (Cl. 260—930)

This invention relates to the preparation of novel halogen containing organic phosphorus compounds.

It is an object of the present invention to prepare novel phosphites, phosphates, phosphonates and thiophosphates.

Another object is to prepare compounds suitable as flame proofing agents.

A further object is to prepare novel flame resistant polyurethanes.

A still further object is to introduce large amounts of aromatically bound halogen together with phosphorus into chemical molecules.

Still further objects and the entire scope of applicability of the invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having one of the following formulae:

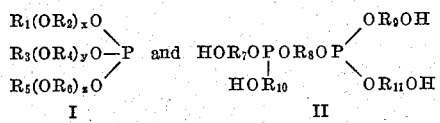

where $R_1$ is a polyhalophenyl group wherein the halogen atoms have an atomic weight of 35 to 80, i.e. the halogen is chlorine or bromine, $R_3$ and $R_5$ are hydroxyalkyl, $R_2$ is alkylene, $R_4$ and $R_6$ are alkylene or hydroxyalkylene, $x$, $y$ and $z$ are zero or a positive integer, $R_7$, $R_9$, $R_{10}$, and $R_{11}$ are alkylene, alkyleneoxy-alkylene or alkylene-poly(oxyalkylene) and $R_8$ is tetrahalo bisphenol A or other tetrahaloalkylidene bisphenols from which the hydroxyl hydrogens have been removed and the halo atoms have an atomic weight of 35 to 80.

A specially preferred class of compounds is that of Formula I where $R_1$ is polyhalophenyl having 3 to 5 halogen atoms and $R_3(OR_4)_yO-$ and $R_5(OR_6)_zO-$ are both residues of a polyalkylene glycol, more preferably polypropylene glycol or polyethylene glycol, most preferably dipropylene glycol. Most preferably $R_1$ is pentachlorophenyl.

The phosphites of Formulae I and II can be converted to the corresponding phosphates by oxidation with 1 mole of hydrogen peroxide (either 30 or 50% concentration) for each phosphorus atom, or with other peroxy compounds, e.g. peracetic acid, or by air oxidation. They can also be converted to the corresponding thiophosphates by heating with 1 atomic weight of sulfur per phosphorus atom. They can also be converted to the corresponding phosphonates by an Arbuzov reaction using catalytic amounts, e.g. 1–10% of alkyl chloride, bromide or iodide or a similar halohydrin at elevated temperatures. Additional examples of suitable catalysts for the Arbuzov rearrangement are set forth in Friedman Patent 3,141,032, col. 1, lines 42–54.

The phosphates can also be prepared by reacting a di(polyhalophenyl) phosphoric acid with an alkylene oxide. Thus pentachlorophenyl phosphoric acid can be reacted with ethylene oxide to give pentachlorophenyl bis(hydroxyethyl) phosphate or with propylene oxide to give pentachlorophenyl bis(hydroxypropoxypropyl) phosphates. The pentachlorophenyl phosphoric acid can be formed by heating pentachlorophenol with phosphoric acid. Alternatively, phenoxy phosphorus oxydichloride can be treated with chlorine to give pentachlorophenoxy phosphorus oxydichloride and the latter reacted with 2 or more moles of alkylene oxide, e.g. propylene oxide to give pentachlorophenyl bis(hydroxypolypropoxypropyl) phosphate having 2, 5 or 10 propoxy units in each polypropoxy group.

The phosphonates can similarly be made in alternative fashion by adding chlorine to phenyl phosphorus oxydichloride to form trichlorophenyl phosphorus oxydichloride or pentachlorophenyl phosphorus oxydichloride followed by reaction with alkylene oxide, e.g. ethylene oxide or propylene oxide to form bis(hydroxypropyl) trichlorobenzene phosphonate or bis(hydroxypropoxypropyl) pentachlorobenzene phosphonate, etc.

The phosphites of the present invention, as well as the phosphates, thiophosphates and phosphonates in general are non volatile liquids and are useful as hydroxyl reactants which impart flame resistance to polyurethanes, polyesters, polyolefins, e.g. polyethylene, polypropylene, ethylene-propylene copolymer, vinyl polymers, e.g. polystyrene and vinyl acetate, acrylates and, methacrylates, e.g. methyl methacrylate polymer and ethyl acrylate polymer, neoprene, natural rubber, butadiene-styrene copolymer, butyl rubber, etc. The phosphites, e.g. in an amount of 1% are stabilizers for vinyl chloride resins.

The phosphite compounds of Formula I of the present invention are conveniently prepared by reacting 1 mole of a hydrocarbon bis (hydroxyalkyl) phosphite, or hydrocarbon bis (hydroxyalkoxyalkyl) phosphite, or hydrocarbon bis (hydroxypolyoxyalkyl) phosphite with 1 mole of a polyhalophenol. Preferably the hydrocarbon group is an aryl group, most preferably phenyl or cresyl.

The reaction to form the phosphite is preferably carried out in the presence of a catalyst. Alkaline catalysts can be employed for the transesterification. Preferably the catalyst has a pH of at least 11 in a 0.1 N solution. Examples of such catalysts are sodium phenate, sodium cresylate, sodium methylate, sodium decylate, potassium phenate, sodium pentachlorophenate, sodium 2,4,6 - trichlorophenate, sodium pentabromophenate. The catalyst is employed in an amount of 0.1—5% of the reactants.

There can also be used as catalysts for the transesterification dihydrocarbon or dihaloaryl phosphite, e.g. 0.1–5% of diphenyl phosphite, di-o-cresyl phosphite, di-p-cresyl phosphite, dimethyl phosphite, didecyl phosphite, dioctadecyl phosphite, di-p-chlorophenyl phosphite, di-2,4,6-trichlorophenyl phosphite, di-pentachlorophenyl phosphite and di-2,4,6-tribromophenyl phosphite.

As the halophenol reactant to form the phosphites of Formula I there can be used 2,3-dichlorophenol, 2,4-dichlorophenol, 2,5-dichlorophenol, 2,6-dichlorophenol, 3,4-dichlorophenol, 3,5-dichlorophenol, 2,3-dibromophenol, 2,4-dibromophenol, 2,5-dibromophenol, 2,6-dibromophenol, 3,4-dibromophenol, 3,5-dibromophenol, 2-chloro-6-bromo-phenol, 2-bromo-3-chlorophenol, 2-chloro-3-bromophenol, 2,4,5-trichlorophenol, 2,4,6-trichlorophenol, 2,4,5 - tribromophenol, 2,4,6 - tribromophenol, 2 - bromo-4,6 - dichlorophenol, 2,4 - dibromo - 6 - chlorophenol, 2,3,4 - trichlorophenol, 2,3,4 - tribromophenol, 2,3,5 - trichlorophenol, 2,3,5 -tribromophenol, 2,3,6 - trichlorophenol, 2,3,6 - tribromophenol, 3,4,5 - trichlorophenol, 3,4,5-tribromophenol, 2,4,5,6 - tetrachlorophenol, 2,4,5,6 - tetrabromophenol, 2,4 - dichloro - 5,6 - dibromophenol, 2,3,4,5-tetrachlorophenol, 2,3,4,5 - tetrabromophenol, 2,3,5,6- tetrachlorophenol, 2,3,5,6 - tetrabromophenol, pentachlorophenol, pentabromophenol, 2,4,6 - trichloro -3,5 - dibromophenol, 2,4,6 - tribromo - 3,5 - dichlorophenol. Instead of pure compounds there can be used commercial mixtures, e.g. of tetrachlorophenol or tetrabromophenol or trichlorophenol or tribromophenol or pentachlorophenol containing several percent of less highly chlorinated phenol.

As the hydrocarbon bis (hydroxyalkyl) phosphite or similar reactant there can be employed phenyl bis (hydroxyethyl) phosphite, phenyl bis (2-hydroxypropyl) phosphite, phenyl bis (4-hydroxybutyl) phosphite, phenyl bis (2 - hydroxybutyl) phosphite, phenyl bis (hydroxyethoxyethyl) phosphite, phenyl bis (2-hydropropoxypropyl) phosphite, p-cresyl bis (2-hydroxypropoxypropyl) phosphite, methyl bis (2-hydroxypropoxypropyl) phosphite, decyl bis (2-hydroxypropoxypropyl) phosphite, phenyl bis (4-hydroxybutoxybutyl) phosphite, phenyl bis (2-hydroxybutoxybutyl) phosphite, phenyl bis (hydroxypolyethoxyethyl) phosphite where there are 2, 5, 10, 50 or 80 ethoxy groups in each polyethoxy radical, phenyl bis (2-hydroxypolypropoxypropyl) phosphite where there are 2, 5, 10, 50 or 80 propoxy groups in each polypropoxy radical, phenyl bis (2 - hydroxypolypropoxypolyethoxyethyl) phosphite where there are 10 propoxy groups in each polypropoxy radical and 7 ethoxy groups in each polyethoxy radical, phenyl bis (2 - hydroxypolybutoxybutyl) phosphite where there are 2, 5, 10, 50 or 80 butoxy groups in each polybutoxy radical, phenyl bis (4-hydroxypolybutoxybutyl) phosphite where there are 2, 5, 10, 50 or 80 butoxy groups in each polybutoxy radical, phenyl bis (3 - hydroxypropoxypropyl) phosphite, phenyl bis (1,2,6-hexanetriol) phosphite, phenyl bis (LHT 240) phosphite (where LHT 240 is the propylene oxide-1,2,6-hexanetriol adduct molecular weight 750), phenyl bis (LHT 42) phosphite (where LHT 42 is the propylene oxide-1,2,6-hexanetriol adduct molecular weight 4000), phenyl bis (LG–56) phosphite (where LG–56 is the propylene oxide-glycerine adduct molecular weight 3000), phenyl bis (LG–168) phosphite (where LG–168 is the propylene oxide-glycerine adduct molecular weight 1000), phenyl bis (Pluracol PeP 450) phosphite (where Pluracol PeP 450 is the propylene oxide pentaerythritol adduct molecular weight 450), phenyl bis (Pluracol TP 400) phosphite (where Pluracol TP 400 is the propylene oxide trimethylolpropane adduct molecular weight 400), phenyl bis (sorbitol-propylene oxide adduct molecular weight 3000) phosphite, phenyl dipropylene glycol 1,2,6-hexanetriol phosphite. As set forth in Friedman Patent 3,009,939 the vast majority of the free hydroxyl groups on the hydrocarbon bis (polypropylene glycol) phosphites are secondary hydroxyl groups although there are some primary hydroxyl groups also.

In order to improve flexibility of the products and to give modified products the halogenated phenols can be first reacted with oxirane or lower alkyloxirane. One or more ethoxy, propoxy or butoxy groups can thus be introduced into the halogenated phenol before the transesterification is carried out. Thus by using ethylene oxide, propylene oxide, or 2-ethyl ethylene oxide there can be formed starting materials such as pentachlorophenoxyethanol, pentabromophenoxyethanol, pentachlorophenoxypropanol-2, pentabromophenoxypropanol-2, pentachlorophenoxybutanol - 2, pentachlorophenoxyethoxyethanol, pentachlorophenoxypropoxypropanol - 2, pentabromophenoxypropoxy - propanol - 2, pentabromophenoxyethoxyethanol, pentachlorophenoxypolypropoxypropanol - 2 (where there are 60 propoxy groups in the polypropoxy radical), pentachlorophenoxypolyethoxyethanol (where there are 9 ethoxy groups in the polyethoxy radical) tetrachlorophenoxyethanol, tetrabromophenoxyethanol, dichlorodibromophenoxyethanol, tetrachlorophenoxypropanol - 2, tetrachlorophenoxy propoxypropanol - 2, tetrabromophenoxypropanol - 2, tetrabromophenoxypropoxypropanol - 2, tetrachlorophenoxypolyethoxyethanol (where there are 15 ethoxy groups in the polyethoxy radical), tetrabromophenoxypolypropoxypropanol - 2 (where there are 5 propoxy groups in the polypropoxy radical), 2,4,5 - trichlorophenoxyethanol, 2',4',6' - trichlorophenoxypropanol - 2, 2',4',6' - tribromophenoxypropoxypropanol - 2, 2,4,5 - trichlorophenoxyethoxyethanol, 2',4',5'-trichlorophenoxypolypropoxypropanol - 2 (where there are an average of 6.8 propoxy groups in the polypropoxy radical).

Illustrative of phosphites of Formula I which are within the present invention are 2,4,6-tribromophenyl bis (dipropylene glycol) phosphite, 2,4,6-trichlorophenyl bis (dipropylene glycol) phosphite, 2,4,5-trichlorophenyl bis (dipropylene glycol) phosphite, 2,4,5-tribromophenyl bis (dipropylene glycol) phosphite, pentachlorophenyl bis (dipropylene glycol) phosphite, pentabromophenyl bis (dipropylene glycol) phosphite, tetrachlorophenyl bis (dipropylene glycol) phosphite, tetrabromophenyl bis (dipropylene glycol phosphite, 2,3,4,6-tetrachlorophenyl bis (dipropylene glycol) phosphite, 2,4,5,6-tetrabromophenyl bis (dipropylene glycol) phosphite, 2,4-dichlorophenyl bis (dipropylene glycol) phosphite, 2,6-dibromophenyl bis (dipropylene glycol) phosphite, 2,4,6-trichloro-3,5-dibromophenyl bis (dipropylene glycol) phosphite, 2,4,6-trichlorophenyl bis (tetramethylene glycol) phosphite, 2,4,6-trichlorophenyl bis (ditetramethylene glycol) phosphite, 2,4,5-trichlorophenyl bis (hexamethylene glycol) phosphite, pentachlorophenyl bis (decamethylene glycol) phosphite, pentabromophenyl bis (2-hydroxypropyl) phosphite, 2,4,5-trichlorophenyl bis (diethylene glycol) phosphite, 2,4,6-trichlorophenyl bis (diethylene glycol) phosphite, 2,4,6-tribromophenyl bis (diethylene glycol) phosphite, tetrachlorophenyl bis (diethylene glycol) phosphite, tetrabromophenyl bis (diethylene glycol) phosphite, pentachlorophenyl bis (diethylene glycol) phosphite, pentabromophenyl bis (diethylene glycol) phosphite, 2,4,6-trichlorophenyl bis (tripropylene glycol) phosphite, 2,4,5-tri-bromophenyl bis (polypropylene glycol molecular weight 425) phosphite, tetraclorophenyl bis (polypropylene glycol molecular weight 2025) phosphite, pentachlorophenyl bis (polypropylene glycol molecular weight 1025) phosphite, pentabromophenyl bis (polypropylene glycol molecular weight 2025) phosphite, pentachlorophenyl bis (triethylene glycol) phosphite, tetrachlorophenyl bis (polyethylene glycol molecular weight 2000) phosphite, 2,4,6-tribromophenyl bis (polyethylene glycol molecular weight 4000) phosphite, 2,4,5-trichlorophenyl bis (glycerine-propylene oxide adduct molecular weight 1000) phosphite, 2,4,6-trichlorophenyl bis (1,2,6-hexanetriol) phosphite, pentachlorophenyl bis (glycerine propylene oxide adduct molecular weight 3000) phosphite, pentachlorophenyl dipropylene glycol 1,2,6-hexanetriol phosphite, pentabromophenyl bis (pentaerythritol-propylene oxide adduct molecular weight 1000) phosphite, tetrachlorophenyl bis (sorbitol-propylene oxide adduct molecular weight 1000) phosphite, 2,4,5-trichlorophenyl bis (1,2,6-hexanetriol-propylene oxide adduct molecular weight 750) phosphite, pentachlorophenyl bis (1,2,6-hexanetriol-propylene oxide adduct molecular weight 4000) phosphite, pentabromophenyl bis (trimethylolpropane-propylene oxide adduct molecular weight 400) phosphite, pentachlorophenyl bis (di-2-ethylethylene glycol) phosphite, 2,4,6-trichlorophenoxyethyl bis (dipropylene glycol) phosphite, 2,4,5-trichlorophenoxyethyl bis (diethylene glycol) phosphite, 2,4,5,6-tetrachlorophenoxyethyl bis (dipropylene glycol) phosphite, pentachlorophenoxyethyl bis (dipropylene glycol) phosphite, pentabromophenoxyethyl bis (dipropylene glycol) phosphite, 2,4,6-tribromophenoxyethyl bis (dipropylene glycol) phosphite, pentachlorophenoxyethyl bis (diethylene glycol) phosphite, 2,4,5-trichlorophenoxyethyl bis (diethylene glycol) phosphite, tetrabromophenoxyethyl bis (diethylene glycol) phosphite, pentachlorophenoxypropyl bis (dipropylene glycol) phosphite, 2,4,5-trichlorophenoxypropyl bis (dipropylene glycol) phosphite, 2,4,6-trichlorophenoxypropyl bis (polyethylene glycol molecular weight 1000) phosphite, tetrachlorophenoxypropyl bis (polypropylene glycol molecular weight 2025) phosphite, pentachlorophenoxyethoxyethyl bis (diethylene glycol) phosphite, pentabromophenoxyethoxyethyl bis (dipropylene glycol) phosphite, 2,4,5-trichlorophenoxyethoxyethyl bis (dipropylene glycol) phosphite, 2,4,6-trichlorophenoxypropoxypropyl bis (dipropylene glycol) phosphite, 2,4,5-tribromophenoxypropoxypropyl bis (diethylene glycol) phosphite, tetrachlorophenoxy (ethyl) ethoxy (ethyl) ethyl bis (dipropylene glycol) phosphite, pentachlorophenoxypolyethoxyethyl bis (dipropylene glycol) phosphite (where there are 19 ethoxy groups in the polyethoxy radical) and pentachlorophenoxypolypropoxypropyl bis (dipropylene glycol) phosphite (where there are 9 propoxy groups in the polypropoxy radical).

Phosphates which can be made by oxidizing the phosphites of Formula I (or by other procedures as previously set forth) include 2,4,6-tribromophenyl bis (dipropylene glycol) phosphate, 2,4,6-trichlorophenyl bis (dipropylene glycol) phosphate, 2,4,5-tribromophenyl bis (dipropylene glycol) phosphate, pentachlorophenyl bis (dipropylene glycol) phosphate, pentabromophenyl bis (dipropylene glycol) phosphate, tetrachlorophenyl bis (dipropylene glycol) phosphate, tetrabromophenyl bis (dipropylene glycol) phosphate, 2,4,5,6-tetrachlorophenyl bis (dipropylene glycol) phosphate, 2,4-dichlorophenyl bis (diethylene glycol) phosphate, 2,6-dibromophenyl bis (dipropylene glycol) phosphate, 2,4,6-trichloro-3,5-dibromophenyl bis (dipropylene glycol) phosphate, 2,4,6-trichlorophenyl bis (tetramethylene glycol) phosphate, 2,4,5-trichlorophenyl bis (hexamethylene glycol) phosphate, pentachlorophenyl bis (decamethylene glycol) phosphate, pentabromophenyl bis (2-hydroxypropyl) phosphate, 2,4,5-trichlorophenyl bis (diethylene glycol) phosphate, 2,4,6-trichlorophenyl bis (diethylene glycol) phosphate, 2,4,6-tribromophenyl bis (diethylene glycol) phosphate, tetrachlorophenyl bis (diethylene glycol) phosphate, tetrabromophenyl bis (diethylene glycol) phosphate, pentachlorophenyl bis (diethylene glycol) phosphate, pentabromophenyl bis (diethylene glycol) phosphate, 2,4,6-trichlorophenyl bis (tripropylene glycol) phosphate, 2,4,5-tribromophenyl bis (polypropylene glycol 425) phosphate, tetrachlorophenyl bis (polypropylene glycol 2025) phosphate, pentachlorophenyl bis (polypropylene glycol 1025) phosphate, pentabromophenyl bis (polypropylene glycol 2025) phosphate, pentachlorophenyl bis (triethylene glycol) phosphate, tetrachlorophenyl bis (polyethylene glycol 2000) phosphate, 2,4,6-tribromophenyl bis (polyethylene glycol 4000) phosphate, 2,4,5-trichlorophenyl bis (glycerine-propylene oxide adduct molecular weight 1000) phosphate, 2,4,6-trichlorophenyl bis (1,2,6-hexanetriol) phosphate, pentachlorophenyl bis (glycerine-propylene oxide adduct molecular weight 3000) phosphate, pentachlorophenyl dipropylene glycol 1,2,6-hexanetriol phosphate, pentabromophenyl bis (pentaerythritol-propylene oxide adduct molecular weight 1000) phosphate, tetrachlorophenyl bis (sorbitolpropylene oxide adduct molecular weight 1000) phosphate, 2,4,5-trichlorophenyl bis (1,2,6-hexanetriol-propylene oxide adduct molecular weight 750) phosphate, pentachlorophenyl bis (1,2,6-hexanetriolpropylene oxide adduct molecular weight 4000) phosphate, pentabromophenyl bis (trimethylolpropane-propylene oxide adduct molecular weight 400) phosphate, pentachlorophenyl bis (di-2-ethylethylene glycol) phosphate, 2,4,6-trichlorophenoxyethyl bis (dipropylene glycol) phosphate, 2,4,5-trichlorophenoxyethyl bis (diethylene glycol) phosphate, 2,4,5,6-tetrachlorophenoxyethyl bis (dipropylene glycol) phosphate, pentachlorophenoxyethyl bis (dipropylene glycol) phosphate, pentabromophenoxyethyl bis (dipropylene glycol) phosphate, 2,4,6-tribromophenoxyethyl bis (dipropylene glycol) phosphate, pentachlorophenoxyethyl bis (diethylene glycol) phosphate, 2,4,5-trichlorophenoxyethyl bis (diethylene glycol) phosphate, tetrabromophenoxyethyl bis (diethylene glycol) phosphate, pentachlorophenoxypropyl bis (dipropylene glycol) phosphate, 2,4,5-trichlorophenoxypropyl bis (dipropylene glycol) phosphate, 2,4,6-trichlorophenoxypropyl bis (polyethylene glycol 1000) phosphate, tetrachlorophenoxypropyl bis (polypropylene glycol 2025) phosphate, pentachlorophenoxyethoxyethyl bis (diethylene glycol) phosphate, pentabromophenoxyethoxyethyl bis (dipropylene glycol) phosphate, 2,4,5-trichlorophenoxyethoxyethyl bis (dipropylene glycol) phosphate, 2,4,6-trichlorophenoxypropoxypropyl bis (dipropylene glycol) phosphate, 2,4,5-tribromophenoxypropoxypropyl bis (diethylene glycol) phosphate, tetrachlorophenoxy (ethyl) ethoxy (ethyl) ethyl bis (dipropylene glycol) phosphate, pentachlorophenoxypolyethoxyethyl bis (dipropylene glycol) phosphate (having 19 ethoxy groups in the polyethoxy radical) and pentachlorophenoxypolypropoxypropyl bis (dipropylene glycol) phosphate (having 9 propoxy groups in the polypropoxy radical).

Thiophosphates which can be made by heating the phosphites of Formula I with sulfur include 2,4,6-tribromophenyl bis (dipropylene glycol) thiophosphate, 2,4,6-trichlorophenyl bis (dipropylene glycol) thiophosphate, 2,4,5-tribromophenyl bis (dipropylene glycol) thiophosphate, pentachlorophenyl bis (dipropylene glycol) thiophosphate, pentabromophenyl bis (dipropylene glycol) thiophosphate, tetrachlorophenyl bis (dipropylene glycol) thiophosphate, tetrabromophenyl bis (dipropylene glycol) thiophosphate, 2,4,5,6-tetrachlorophenyl bis (dipropylene glycol) thiophosphate, 2,4-dichlorophenyl bis (diethylene glycol) thiophosphate, 2,6-dibromophenyl bis (dipropylene glycol) thiophosphate, 2,4,6-trichloro-3,5-dibromophenyl bis (dipropylene glycol) thiophosphate, 2,4,6-trichlorophenyl bis (tetramethylene glycol) thiophosphate, 2,4,5-trichlorophenyl bis (hexamethylene glycol) thiophosphate, pentachlorophenyl bis (decamethylene glycol) thiophosphate, pentabromophenyl bis (2-hydroxypropyl) thiophosphate, 2,4,5-trichlorophenyl bis (diethylene glycol) thiophosphate, 2,4,6-trichlorophenyl bis (diethylene glycol) thiophosphate, 2,4,6-tribromophenyl bis (diethylene glycol) thiophosphate, tetrachlorophenyl bis (diethylene glycol) thiophosphate, tetrabromophenyl bis (diethylene glycol) thiophosphate, pentachlorophenyl bis (diethylene glycol) thiophosphate, pentabromophenyl bis (diethylene glycol) thiophosphate, 2,4,6-trichlorophenyl bis (tripropylene glycol) thiophosphate, 2,4,5-tribromophenyl bis (polypropylene glycol 425) thiophosphate, tetrachlorophenyl bis (polypropylene glycol 2025) thiophosphate, pentachlorophenyl bis (polypropylene glycol 1025) thiophosphate, pentabromophenyl bis (polypropylene glycol 2025) thiophosphate, pentachlorophenyl bis (triethylene glycol) thiophosphate, tetrachlorophenyl bis (polyethylene glycol 2000) thiophosphate, 2,4,6-tribromophenyl bis (polyethylene glycol 4000) thiophosphate, 2,4,5-trichlorophenyl bis (glycerine-propylene oxide adduct molecular weight 1000) thiophosphate, 2,4,6-trichlorophenyl bis (1,2,6-hexanetriol) thiophosphate, pentachlorophenyl dipropylene glycol 1,2,6-hexanetriol thiophosphate, tetrachlorophenyl bis (sorbitol-propylene oxide adduct molecular weight 1000) thiophosphate, 2,4,5-trichlorophenyl bis (1,2,6-hexanetriol-propylene oxide adduct molecular weight 750) thiophosphate, pentabromophenyl bis (trimethylolpropane-propylene oxide adduct molecular weight 400) thiophosphate, 2,4,6-trichlorophenoxyethyl bis (dipropylene glycol) thiophosphate, 2,4,5-trichlorophenoxyethyl bis (diethylene glycol) thiophosphate, 2,4,5,6-tetrachlorophenoxyethyl bis (dipropylene glycol) thiophosphate, pentachlorophenoxyethyl bis (dipropylene glycol) thiophosphate, pentabromophenoxyethyl bis (dipropylene glycol) thiophosphate, 2,4,6-tribromophenoxyethyl bis (dipropylene glycol) thiophosphate, pentachlorophenoxyethyl bis (diethylene glycol) thiophosphate, 2,4,5-trichlorophenoxyethyl bis (diethylene glycol) thiophosphate, tetrabromophenoxyethyl bis (diethylene glycol) thiophosphate, pentachlorophenoxypropyl bis (dipropylene glycol) thiophosphate, 2,4,5-trichlorophenoxypropyl bis (dipropylene glycol) thiophosphate, 2,4,6-trichlorophenoxypropyl bis (polyethylene glycol 1000) thiophosphate, tetrachlorophenoxypropyl bis (polypropylene glycol 2025) thiophosphate, pentachlorophenoxyethoxyethyl bis (diethylene glycol) thiophosphate, pentabromophenoxyethoxyethyl bis (dipropylene glycol) thiophosphate, 2,4,5-trichlorophenoxyethoxyethyl bis (dipropylene glycol) thiophosphate, 2,4,6-trichlorophenoxypropoxypropyl bis (dipropylene glycol) thiophosphate, 2,4,5-tribromophenoxypropoxypropyl bis (diethylene glycol) thiophosphate, pentachlorophenoxypolyethoxyethyl bis (dipropylene glycol) thiophosphate (having 19 ethoxy groups in the polyethoxy radical) and pentachlorophenoxypolypropoxypropyl bis (dipropylene glycol) thiophosphate (having 9 propoxy groups in the polypropoxy radical).

Phosphonates isomeric with the phosphites of Formula I which can be made in the manner set forth earlier and which are within the invention include the bis (dipropylene glycol) ester of 2,4,6-tribromobenzene phosphonic acid, dipropylene glycol 2,4,6-tribromophenyl ester of hydroxypropoxypropane phosphonic acid, bis (dipropylene glycol) ester of 2,4,6-trichlorobenzene phosphonic acid, dipropylene glycol 2,4,6-tribromophenyl ester of 2-hydroxypropoxy-propane phosphonic acid, bis (dipropylene glycol) ester of 2,4,5-trichlorobenzene phosphonic acid, dipropylene glycol 2,4,5-trichlorophenyl ester of 2-hydroxypropoxypropane phosphonic acid, bis (dipropylene glycol) ester of 2,4,5-tribromobenzene phosphonic acid, dipropylene glycol 2,4,5-tribromophenyl ester of 2-hydroxypropoxypropane phosphonic acid, bis (dipropylene glycol) ester of pentachlorobenzene phosphonic acid, dipropylene glycol pentachlorophenyl ester of 2-hydroxypropoxypropane phosphonic acid, bis (dipropylene glycol) ester of pentabromobenzene phosphonic acid, dipropylene glycol pentabromophenyl ester of 2-hydroxypropoxypropane phosphonic acid, bis (dipropylene glycol) ester of tetrachlorobenzene phosphonic acid, dipropylene glycol tetrachlorophenyl ester of 2-hydroxypropoxypropane phosphonic acid, bis (dipropylene glycol) ester of tetrabromobenzene phosphonic acid, dipropylene glycol tetrabromophenyl ester of 2-hydroxypropoxypropane phosphonic acid, bis (dipropylene glycol) ester of 2,4,6-trichloro-3,5-dibromobenzene phosphonic acid, dipropylene glycol 2,4,6-trichloro-3,5-dibromophenyl ester of 2-hydroxypropoxypropane phosphonic acid, bis (tetramethylene glycol) ester of 2,4,6-trichlorobenzene phosphonic acid, tetramethylene glycol 2,4,6-trichlorophenyl ester of 4-hydroxybutane phosphonic acid, bis (hexamethylene glycol) ester of 2,4,5-trichlorobenzene phosphonic acid, hexamethylene glycol 2,4,5-trichlorophenyl ester of 6-hydroxyhexane phosphonic acid, bis (decamethylene glycol) ester of pentachlorobenzene phosphonic acid, decamethylene glycol pentachlorophenyl ester of 10-hydroxydecane phosphonic acid, bis (2-hydroxypropyl) ester of pentabromobenzene phosphonic acid, 2-hydroxypropyl pentabromophenyl ester of 2-hydroxypropane phosphonic acid, bis (diethylene glycol) ester of 2,4,5-trichlorobenzene phosphonic acid, diethylene glycol 2,4,5-trichlorophenyl ester of hydroxyethoxyethane phosphonic acid, bis (diethylene glycol) ester of 2,4,6-trichlorobenzene phosphonic acid, diethylene glycol 2,4,6-trichlorophenyl ester of hydroxyethoxyethane phosphonic acid, bis (diethylene glycol) ester of 2,4,6-tribromobenzene phosphonic acid, diethylene glycol 2,4,6-tribromophenyl ester of hydroxyethoxyethane phosphonic acid, bis (diethylene glycol) ester of tetrachlorobenzene phosphonic acid, diethylene glycol tetrachlorophenyl ester of hydroxyethoxyethane phosphonic acid, bis (diethylene glycol) ester of tetrabromobenzene phosphonic acid, diethylene glycol tetrabromophenyl ester of hydroxyethoxyethane phosphonic acid, bis (diethylene glycol) ester of pentachlorobenzene phosphonic acid, diethylene glycol pentachlorophenyl ester of hydroxyethoxyethane phosphonic acid, bis (diethylene glycol) ester of pentabromobenzene phosphonic acid, diethylene glycol pentabromophenyl ester of hydroxyethoxyethane phosphonic acid, bis (tripropylene glycol) ester of 2,4,6-trichlorobenzene phosphonic acid, tripropylene glycol 2,4,6-trichlorophenyl ester of 2-hydroxypropoxypropoxypropane phosphonic acid, bis (polypropylene glycol 425) ester of 2,4,5-tribromobenzene phosphonic acid, polypropylene glycol 425 2,4,5-tribromophenyl ester of 2-hydroxypolypropoxypropane phosphonic acid (where the hydroxypolypropoxypropane group has a molecular weight of 425), bis (polypropylene glycol 2025) ester of pentabromobenzene phosphonic acid, polypropylene glycol 2025 pentabromophenyl ester of 2-hydroxypolypropoxypropane phosphonic acid (where the hydroxypolypropoxypropane group has a molecular weight of 2025), bis (triethylene glycol) ester of pentachlorobenzene phosphonic acid, triethylene glycol pentachlorophenyl ester of hydroxyethoxyethoxyethane phosphonic acid, bis (polyethylene glycol 4000) ester of 2,4,6-tribromobenzene phosphonic acid, polyethylene glycol 4000 2,4,6-tribromophenyl ester of hydroxypolyethoxyethane phosphonic acid (where the hydroxypolyethoxyethane group has a molecular weight of 4000), bis (glycerine-propylene oxide adduct molecular weight 1000) ester of 2,4,5-trichlorobenzene phosphonic acid, glycerine-propylene oxide adduct molecular weight 1000 2,4,5-trichlorophenyl ester of glycerine-propylene oxide adduct molecular weight 1000 phosphonic acid, bis (1,2,6-hexanetriol) ester of 2,4,6-trichlorobenzene phosphonic acid, 1,2,6-hexanetriol 2,4,6-trichlorophenyl ester of 1,6-dihydroxyhexane-2-phosphonic acid, dipropylene glycol 1,2,6-hexanetriol pentachlorobenzene phosphonic acid, 1,2,6-hexanetriol pentachlorophenyl ester of 2-hydroxypropoxypropane phosphonic acid, bis (dipropylene glycol) ester of 2,4,6-trichlorophenylethane phosphonic acid, dipropylene glycol 2,4,6-trichlorophenoxyethyl ester of 2-hydroxypropoxypropane phosphonic acid, bis (diethylene glycol) ester of 2,4,6-trichlorophenylethane phosphonic acid, bis (diethylene glycol) ester of 2,4,5-trichlorophenoxyethane phosphonic acid, diethylene glycol 2,4,5-trichlorophenoxyethyl ester of hydroxyethoxyethane phosphonic acid, bis (dipropylene glycol) ester of tetrachlorophenoxyethane phosphonic acid, dipropylene glycol tetrachlorophenoxyethyl ester of 2-hydroxypropoxypropane phosphonic acid, bis (dipropylene glycol) ester of pentachlorophenoxyethane phosphonic acid, dipropylene glycol pentachlorophenoxyethyl ester of 2-hydroxypropoxypropane phosphonic acid, bis (dipropylene glycol) ester of pentabromophenoxyethane phosphonic acid, dipropylene glycol pentabromophenoxyethyl ester of 2-hydroxypropoxypropane phosphonic acid, bis (dipropylene glycol) ester of 2,4,6-tribromophenoxyethane phosphonic acid, dipropylene glycol 2,4,6-tribromophenoxyethyl ester of hydroxypropoxypropane phosphonic acid, bis (diethylene glycol) ester of pentachlorophenoxyethane phosphonic acid, diethylene glycol pentachlorophenoxyethyl ester of hydroxyethoxyethane phosphonic acid, bis (diethylene glycol) ester of 2,4,5-trichlorophenoxyethane phosphonic acid, diethylene glycol 2,4,5-tri-chlorophenoxyethyl ester of hydroxyethoxyethane phosphonic acid, bis (diethylene glycol) ester of tetrabromophenoxyethane phosphonic acid, diethylene glycol tetrabromophenoxyethyl ester of hydroxyethoxyethane phosphonic acid, bis (dipropylene glycol) ester of pentachlorophenoxypropane phosphonic acid, dipropylene glycol pentachlorophenoxypropyl ester of hydroxypropoxypropane phosphonic acid, bis (dipropylene glycol) ester of 2,4,5-trichlorophenoxy-propane phosphonic acid, dipropylene glycol 2,4,5-trichlorophenoxypropyl ester of hydroxypropoxypropane phosphonic acid, bis (polypropylene glycol 2025) ester of tetrachlorophenoxypropane phosphonic acid, polypropylene glycol 2025 tetrachlorophenoxypropyl ester of hydroxypolypropoxypropane phosphonic acid (when the hydroxypolypropoxypropane group has a molecular weight of 2025), bis (dipropylene glycol) ester of pentabromophenoxyethoxyethane phosphonic acid, dipropylene glycol pentabromophenoxyethoxyethyl ester of hydroxypropoxypropane phosphonic acid, bis (diethylene glycol) ester of pentachlorophenoxyethoxyethane phosphonic acid, diethylene glycol pentachlorophenoxyethoxyethyl ester of hydroxyethoxyethane phosphonic acid, bis (dipropylene glycol) ester of pentachlorophenoxypolyethoxyethane phosphonic acid (where there are 19 ethoxy groups in the polyethoxy radical), dipropylene glycol pentachlorophenoxypolyethoxyethyl ester of hydroxypropoxypropane (where there are 19 ethoxy groups in the polyethoxy radical).

Phosphites within Formula II are prepared by reacting 1 mole of tetrachlorobisphenol A or tetrabromobisphenol A with 2 moles of a hydrocarbon bis (hydroxyalkyl) phosphite, or hydrocarbon bis (hydroxyalkoxyalkyl) phosphite or hydrocarbon bis (hydroxypolyalkoxyalkyl) phosphite. The same starting phosphites can be employed as those used to prepare the product of Formula I. There can also be employed the same catalysts as those set forth as suitable for preparing the compounds of Formula I. The phosphites of Formula II can be oxidized to the corresponding phosphates by utilizing 2 moles of hydrogen peroxide or the other oxidizing agents set forth previously as suitable for converting the phosphites of Formula I to phosphates. Similarly thiophosphates can be prepared by heating the phosphites of Formula II with 2 moles of sulfur. Likewise the phosphites of Formula II can be converted into phosphonates by Arbuzov rearrangement using catalytic amounts of alkyl halides or alkali metal or alkaline earth metal halides, e.g. amyl iodide, sodium iodide, calcium iodide, butyl bromide, etc.

Illustrative of phosphites of Formula II which are within the present invention is tetrakis (dipropylene glycol) tetrachloro (Bisphenol A) diphosphite having the formula

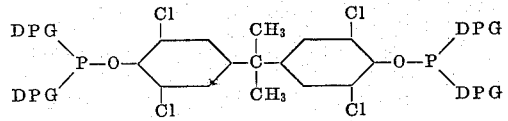

where DPG stands for the dipropylene glycol residue. While the halogenation of bisphenol A results primarily in the 4 halogen atoms being in the 4 ortho positions to the two hydroxyl groups it will be appreciated that there can also be present a minor amount of isomers with one or more halogen atoms meta to the hydroxyl groups. Other phosphites within Formula II include tetrakis (dipropylene glycol) tetrabromo (Bisphenol A) diphosphite, tetrakis (dipropylene glycol) dichloro dibromo (Bisphenol A) diphosphite, tetrakis (tetramethylene glycol) tetrachloro (Bisphenol A) diphosphite, tetrakis (tetramethylene glycol) tetrabromo (Bisphenol A) diphosphite, tetrakis (hexamethylene glycol) tetrachloro (Bisphenol A) diphosphite, tetrakis (hexamethylene glycol) tetrabromo (Bisphenol A) diphosphite, tetrakis (decamethylene glycol) tetrachloro (Bisphenol A) diphosphite, tetrakis (decamethylene glycol) tetrabromo (Bisphenol A) diphosphite, tetrakis (2-hydroxypropyl) tetrachloro (Bisphenol A) diphosphite, tetrakis (diethylene glycol) tetrachloro (Bisphenol A) diphosphite, tetrakis (diethylene glycol) tetrabromo (Bisphenol A) diphosphite, tetrakis (tripropylene glycol) tetrachloro (Bisphenol A) diphosphite, tetrakis (tripropylene glycol) tetrabromo (Bisphenol A) diphosphite, tetrakis (polypropylene glycol 425) tetrachloro (Bisphenol A) diphosphite, tetrakis (polypropylene glycol 425) tetrabromo (Bisphenol A) diphosphite, tetrakis (polypropylene glycol 1025) tetrachloro (Bisphenol A) diphosphite, tetrakis (polypropylene glycol 1025) tetrabromo (Bisphenol A) diphosphite, tetrakis (polypropylene glycol 2025) tetrachloro (Bisphenol A) diphosphite, tetrakis (polypropylene glycol 2025) tetrabromo (Bisphenol A) diphosphite, tetrakis (triethylene glycol) tetrachloro (Bisphenol A) diphosphite, tetrakis (triethylene glycol) tetrabromo (Bisphenol A) diphosphite, tetrakis (polyethylene glycol 2000) tetrachloro (Bisphenol A) diphosphite, tetrakis (polyethylene glycol 2000) tetrabromo (Bisphenol A) diphosphite, tetrakis (polyethylene glycol 4000) tetrachloro (Bisphenol A) diphosphite, tetrakis (glycerine-propylene oxide adduct 1000) tetrachloro (Bisphenol A) diphosphite, tetrakis (glycerine-propylene oxide adduct 1000) tetrabromo (Bisphenol A) diphosphite, tetrakis (glycerine-propylene oxide adduct 3000) tetrachloro (Bisphenol A) diphosphite, tetrakis (glycerine-propylene oxide adduct 3000) tetrabromo (Bisphenol A) diphosphite, tetrakis (1,2,6-hexanetriol) tetrachloro (Bisphenol A) diphosphite, tetrakis (1,2,6-hexanetriol) tetrabromo (Bisphenol A) diphosphite, bis dipropylene glycol bis 1,2,6-hexanetriol tetrachloro (Bisphenol A) diphosphite, tetrakis (pentaerythritol-propylene oxide adduct 1000) tetrachloro (Bisphenol A) diphosphite, tetrakis (pentaerythritol-propylene oxide adduct 1000) tetrabromo (Bisphenol A) diphosphite, tetrakis (sorbitol-propylene oxide adduct 1000) tetrachloro (Bisphenol A) diphosphite, tetrakis (sorbitol-propylene oxide adduct 1000) tetrabromo (Bisphenol A) diphosphite, tetrakis (1,2,6-hexanetriol-propylene oxide adduct 750) tetrachloro (Bisphenol A) diphosphite, tetrakis (1,2,6-hexanetriol-propylene oxide adduct 750) tetrabromo (Bisphenol A) diphosphite, tetrakis (1,2,6-hexanetriol-propylene oxide adduct 4000) tetrachloro (Bisphenol A) diphosphite, tetrakis (1,2,6-hexanetriol-propylene oxide adduct 4000) tetrabromo (Bisphenol A) diphosphite, tetrakis (trimethylolpropane-propylene oxide adduct 400) tetrachloro (Bisphenol A) diphosphite, tetrakis (trimethylolpropane-propylene oxide adduct 400) tetrabromo (Bisphenol A) diphosphite and tetrakis (2-ethyl-ethylene glycol) tetrachloro (Bisphenol A) diphosphite.

There are also included in the invention tetrakis (dipropylene glycol) tetrachloro 2-butylidene diphenol, tetrakis (dipropylene glycol) tetrabromo ethylidene diphenol, tetrakis (diethylene glycol) tetrachloro 2-butylidene diphenol, tetrakis (dipropylene glycol) tetrachloro-3-heptylidene diphenol, tetrakis (dipropylene glycol) tetrachloro methylene diphenol. The preferred compounds within Formula II are the derivatives of bisphenol A, phosphates which can be made by oxidizing the phosphites of Formula II e.g. with two moles of hydrogen peroxide or by other procedures such as reacting tetrachloro (Bisphenol A) with bis dipropylene glycol chlorophosphate include tetrakis (dipropylene glycol) tetrachloro (Bisphenol A) diphosphates, tetrakis (dipropylene glycol) tetrabromo (Bisphenol A) diphosphate, tetrakis (dipropylene glycol) dibromo dichloro (Bisphenol A) diphosphate, tetrakis (tetramethylene glycol) tetrachloro (Bisphenol A) diphosphate, tetrakis (hexamethylene glycol) tetrabromo (Bisphenol A) diphosphate, tetrakis (decamethylene glycol) tetrachloro (Bisphenol A) diphosphate, tetrakis (2-hydroxypropyl) tetrachloro (Bisphenol A) diphosphate, tetrakis (diethylene glycol) tetrachloro (Bisphenol A) diphosphate, tetrakis (diethylene glycol) tetrabromo (Bisphenol A) diphosphate, tetrakis (tripropylene glycol) tetrachloro (Bisphenol A) diphosphate, tetrakis (tripropylene glycol) tetrabromo (Bisphenol A) diphosphate, tetrakis (polypropylene glycol 425) tetrachloro (Bisphenol A) diphosphate, tetrakis (polypropylene glycol 425) tetrabromo (Bisphenol A) diphosphate, tetrakis (polypropylene glycol 1025) tetrachloro (Bisphenol A) diphosphate, tetrakis (polypropylene glycol 2025) tetrachloro (Bisphenol A) diphosphate, tetrakis (polypropylene glycol 2025) tetrabromo (Bisphenol A) diphosphate, tetrakis (triethylene glycol) tetrachloro (Bisphenol A) diphosphate, tetrakis (triethylene glycol) tetrabromo (Bisphenol A) diphosphate, tetrakis (polyethylene glycol 2000) tetrachloro (Bisphenol A) diphosphate, tetrakis (polyethylene glycol 4000) tetrachloro (Bisphenol A) diphosphate, tetrakis (polyethylene glycol 4000) tetrabromo (Bisphenol A) diphosphate, tetrakis (glycerine-propylene oxide adduct 1000) tetrachloro (Bisphenol A) diphosphate, tetrakis (glycerine propylene oxide adduct 3000) tetrabromo (Bisphenol A) diphosphate, tetrakis (1,2,6-hexanetriol) tetrachloro (Bisphenol A) diphosphate, tetrakis (pentaerythritolpropylene oxide adduct 1000) tetrachloro (Bisphenol A) diphosphate, tetrakis (sorbitol-propylene oxide adduct 1000) tetrabromo (Bisphenol A) diphosphate, tetrakis (1,2,6-hexanetriol-propylene oxide adduct 750) tetrabromo (Bisphenol A) diphosphate, tetrakis (1,2,6-hexanetriol-propylene oxide adduct 4000) tetrachloro (Bisphenol A) diphosphate, and tetrakis (trimethylolpropane-propylene oxide adduct 400) tetrachloro (Bisphenol A) diphosphate, tetrakis (dipropylene glycol) tetrachloro 2-butylidene diphenol.

Thiophosphates which can be made by reacting two moles of sulfur with the phosphites of Formula II include tetrakis (dipropylene glycol) tetrachloro (Bisphenol A) dithiophosphate, tetrakis (dipropylene glycol) tetrabromo (Bisphenol A) dithiophosphate, tetrakis (dipropylene glycol) dichloro dibromo (Bisphenol A) dithiophosphate, tetrakis (tetramethylene glycol) tetrachloro (Bisphenol A) dithiophosphate, tetrakis (hexamethylene glycol) tetrabromo (Bisphenol A) dithiophosphate, tetrakis (decamethylene glycol) tetrachloro (Bisphenol A) dithiophosphate, tetrakis (diethylene glycol) tetrachloro (Bisphenol A) dithiophosphate, tetrakis (diethylene glycol) tetrabromo (Bisphenol A) dithiophosphate, tetrakis (tripropylene glycol) tetrachloro (Bisphenol A) dithiophosphate, tetrakis (polypropylene glycol 425) tetrabromo (Bisphenol A) dithiophosphate, tetrakis (polypropylene glycol 2025) tetrachloro (Bisphenol A) dithiophosphate, tetrakis (triethylene glycol) tetrabromo (Bisphenol A) dithiophosphate, tetrakis (polyethylene glycol 2000) tetrachloro (Bisphenol A) dithiophosphate, tetrakis (polyethylene glycol 4000) tetrabromo (Bisphenol A) dithiophosphate, tetrakis (glycerine-propylene oxide adduct 3000) tetrachloro (Bisphenol A) dithiophosphate, tetrakis (sorbitol-propylene oxide adduct 1000) tetrabromo (Bisphenol A) dithiophosphate, tetrakis (pentaerythritolpropylene oxide adduct 1000) tetrachloro (Bisphenol A) dithiophosphate, tetrakis (1,2,6-hexanetriol-propylene oxide adduct 750) tetrabromo (Bisphenol A) dithiophosphate, and tetrakis (trimethylolpropane-propylene oxide adduct 400) tetrachloro (Bisphenol A) dithiophosphate.

Phosphonates isomeric with the phosphites of Formula II which can be made by Arbuzov rearrangement of the phosphites of Formula II and which are within the invention include bis (hydroxypropoxypropane) bis (dipropylene glycol) tetrachloro (Bisphenol A) diphosphonate having the formula

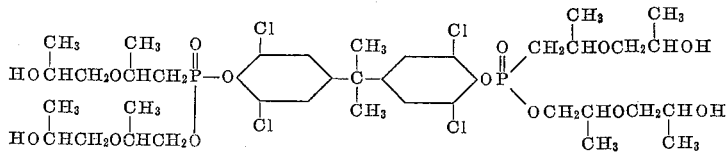

bis (hydroxypropoxypropane) bis (dipropylene glycol) tetrabromo (Bisphenol A) diphosphonate, bis (4-hydroxybutane) bis (tetramethylene glycol) tetrachloro (Bisphenol A) diphosphonate, bis (10-hydroxydecane) bis (decamethylene glycol) tetrabromo (Bisphenol A) diphosphonate, bis (hydroxyethoxyethane) bis (diethylene glycol) tetrachloro (Bisphenol A) diphosphonate, bis (hydroxyethoxyethane) bis (diethylene glycol) tetrabromo (Bisphenol A) diphosphonate, bis (2-hydroxypropane) bis (hydroxypropyl) tetrachloro (Bisphenol A) diphosphonate, bis (hydroxypropoxy-propoxypropane) bis (tripropylene glycol) tetrachloro (Bisphenol A) diphosphonate, bis (hydroxypolypropoxypropane) bis (polypropylene glycol 2025) tetrachloro (Bisphenol A) diphosphonate (where the polypropoxypropane group has a molecular weight of 2025), bis (hydroxyethoxyethoxyethane) bis (triethylene glycol) tetrabromo (Bisphenol A) diphosphonate bis (hydroxypolyethoxyethane) bis (polyethylene glycol 4000) tetrachloro (Bisphenol A) diphosphonate (where the hydroxypolyethoxyethane group has a molecular weight of 4000), the diphosphonate prepared by Arbuzov rearrangement of tetrakis (glycerine-propylene oxide adduct 1000) tetrachloro (Bisphenol A) diphosphite, the diphosphonate prepared by Arbuzov rearrangement of tetrakis (1,2,6-hexanetriol-propylene oxide adduct 750) tetrabromo (Bisphenol A) diphosphite, the diphosphonate prepared by Arbuzov rearrangement of tetrakis (sorbitol-propylene oxide adduct 1000) diphosphite, bis (hydroxypropoxypropane) bis (dipropylene glycol) tetrachloro (2-butylidene diphenyl) diphosphonate.

Unless otherwise stated all parts and percentages are by weight.

*Example 1*

390 parts (1 mole) of phenyl bis (dipropylene glycol) phosphite, 330 parts (1 mole) of recrystallized 2,4-6-tribromophenol and 10 parts of sodium phenate were subjected to vacuum distillation. Terminal conditions were 130° C. and 3 torr. 92 parts of phenol were removed as distillate. The residue was 2,4,6-tribromophenyl bis (dipropylene glycol) phosphite, a light yellow liquid of medium viscosity. It had a refractive index $n_D^{25}$ of 1.5393, acid number of 0.88 and hydroxyl number of 175 (theory 178).

*Example 2*

390 parts (1 mole) phenyl bis (dipropylene glycol) phosphite, 197 parts (1 mole) of recrystallized 2,4,6-trichlorophenol and 10 parts of sodium phenate were subjected to vacuum distillation. Terminal conditions were 130° C. and 3 torr. 90 parts of phenol were removed as distillate. The residue was 2,4,6-trichlorophenyl bis (dipropylene glycol) phosphite, a liquid having a refractive index of 1.5200, acid number of 0.58 and hydroxyl number of 230 (theory 228).

*Example 3*

390 parts of phenyl bis (dipropylene glycol) phosphite, 197 parts of redistilled 2,4,5-trichlorophenol and 10 parts of sodium phenate were subjected to vacuum distillation. Terminal conditions were 135° C. and 5 torr. 90 parts of phenol were removed as distillate. The residue was 2,4,5-trichlorophenyl bis (dipropylene glycol) phosphite, a light yellow liquid of medium viscosity having a refractive index of 1.5140, an acid number of 0.12 and a hydroxyl number of 226 (theory 228).

*Example 4*

The procedure of Example 1 was repeated replacing the 2,4-6-tribromophenol by 1 mole of pentabromophenol to produce pentabromophenyl bis (dipropylene glycol) phosphite.

*Example 5*

The procedure of Example 2 was repeated replacing the 2,4,6-trichlorophenol by 1 mole of pentachlorophenol to produce pentachlorophenyl bis (dipropylene glycol) phosphite.

*Example 6*

The procedure of Example 2 was repeated replacing the phenyl bis (dipropylene glycol) phosphite by 1 mole of phenyl bis (hexamethylene glycol) phosphite to produce 2,4,6-trichlorophenyl bis (hexamethylene glycol) phosphite.

*Example 7*

The procedure of Example 1 was repeated replacing the phenyl bis (dipropylene glycol) phosphite by 1 mole

Example 8

The procedure of Example 2 was repeated replacing the phenyl bis (dipropylene glycol) phosphite by 1 mole of phenyl bis (diethylene glycol) phosphite to produce 2,4,6-trichlorophenyl bis (diethylene glycol) phosphite.

Example 9

The procedure of Example 3 was repeated replacing the phenyl bis (dipropylene glycol) phosphite by 1 mole of phenyl bis (polypropylene glycol 2025) phosphite to produce 2,4,5-trichlorophenyl bis (polypropylene glycol 2025) phosphite.

Example 10

The procedure of Example 2 was repeated replacing the phenyl bis (dipropylene glycol) phosphite by 1 mole of phenyl bis (1,2,6-hexanetriol-propylene oxide adduct 750) phosphite to produce 2,4,6-trichlorophenyl bis (1,2,6-hexanetriol-propylene oxide adduct 750) phosphite.

Example 11

The procedure of Example 1 was repeated replacing the 2,4,6-tribromophenol by 1 mole of 2,4,6-tribromophenoxyethanol to produce 2,4,6-tribromophenoxyethyl bis (dipropylene glycol) phosphite.

Example 12

The procedure of Example 2 was repeated replacing the 2,4,6-trichlorophenol by 1 mole of 2,4,6-trichlorophenoxyethanol bis (dipropylene glycol) phosphite.

Example 13

1 mole of 50% aqueous hydrogen peroxide was stirred into 1 mole of 2,4,6-tribromophenyl bis (dipropylene glycol) phosphite. After reaction was complete, the water was distilled off leaving a residue of 2,4,6-tribromophenyl bis (dipropylene glycol) phosphate.

Example 14

1 mole of 50% aqueous hydrogen peroxide was stirred into 1 mole of 2,4,6-trichlorophenyl bis (dipropylene glycol) phosphite. After reaction was complete the water was distilled off leaving a residue of 2,4,6-trichlorophenyl bis (dipropylene glycol) phosphate. In similar fashion there were prepared 2,4,6-trichlorophenyl bis (diethylene glycol) phosphate and 2,4,6-trichlorophenoxyethyl bis (dipropylene glycol) phosphate from the corresponding phosphites.

Example 15

1 mole of 50% aqueous hydrogen peroxide was stirred into 1 mole of pentachlorophenyl bis (dipropylene glycol) phosphite. After reaction was complete the water was distilled off leaving a residue of pentachlorophenyl bis (dipropylene glycol) phosphate.

Example 16

To 1 mole of 2,4,6-trichlorophenyl bis (dipropylene glycol) phosphite there was added 1 mole of sulfur. The mixture was heated to 130° C. until reaction was complete. The product was 2,4,6-trichlorophenyl bis (dipropylene glycol) thiophosphate.

Example 17

1 mole of 2,4,6-trichlorophenyl bis (dipropylene glycol) phosphite was heated with 5 mole percent of n-butyl bromide at 125–135° C. for 8 hours. Volatile material was stripped off at 150° C. and 10 mm. The liquid residue was essentially 2,4,6-trichlorophenyl dipropylene glycol hydroxypropoxypropane phosphonate containing a very small amount of trichlorophenyl dipropylene glycol butane phosphonate.

Example 18

The procedure of Example 17 was repeated replacing the 2,4,6-trichlorophenyl bis (dipropylene glycol) phosphite by 1 mole of 2,4,6-tribromophenyl bis (dipropylene glycol) phosphite to produce 2,4,6-tribromophenyl dipropylene glycol hydroxypropoxypropane phosphonate.

1 mole of pentachlorophenyl bis (dipropylene glycol) phosphite was heated with 5 moles of propylene bromohydrin for 8 hours at 125–135° C. The excess propylene bromohydrin and bromopropyl hydroxypropyl ether formed were stripped off in a vacuum (5 mm.) and pentachlorophenyl dipropylene glycol 2-hydroxypropane phosphonate recovered as the residue.

Example 19

The procedure of Example 17 was repeated replacing the 2,4,6-trichlorophenyl bis (dipropylene glycol) phosphite by 1 mole of 2,4,5-trichlorophenyl bis (diethylene glycol) phosphite to produce 2,4,5-trichlorophenyl diethylene glycol hydroxyethoxyethane phosphonate.

Example 20

The procedure of Example 17 was repeated replacing the 2,4,6-trichlorophenyl bis (dipropylene glycol) phosphite by 2,4,6-trichlorophenyl bis (hexamethylene glycol) phosphite to produce 2,4,6-trichlorophenyl hexamethylene glycol 6-hydroxyhexane phosphonate.

Example 21

2 moles of dipropylene glycol were heated at 160° C. in a receptacle equipped with a condenser and 1 mole of 2,4,5-trichlorophenyl phosphorus oxydichloride was added dropwise over a period of one hour and the mixture maintained at 160° C. for 5 hours. The hydrogen chloride formed was removed as a gas and the residue was the bis (dipropylene glycol) ester of 2,4,5-trichlorobenzene phosphonic acid.

Example 22

2 moles of phenyl bis (dipropylene glycol) phosphite, 1 mole of tetrachloro (Bisphenol A) and 10 parts of sodium phenate were subjected to vacuum conditions. Terminal conditions were 130° C. and 3 torr. 182 parts of phenol were removed as distillate. The liquid residue was tetrakis (dipropylene glycol) tetrachloro (Bisphenol A) diphosphite, hydroxyl number 232, also called tetrakis (dipropylene glycol) tetrachloro isopropylidene diphenol.

Example 23

The procedure of Example 22 was repeated replacing the tetrachloro (Bisphenol A) by 1 mole of tetrabromo (Bisphenol A) to produce tetrakis (dipropylene glycol) tetrabromo (Bisphenol A) diphosphite, hydroxyl number 197.

Example 24

The procedure of Example 22 was repeated replacing the phenyl bis (dipropylene glycol) phosphite by 2 moles of phenyl bis (hexamethylene glycol) phosphite to produce tetrakis (hexamethylene glycol) tetrachloro (Bisphenol A) diphosphite.

Example 25

The procedure of Example 22 was repeated replacing the phenyl bis (dipropylene glycol) phosphite by 2 mols of phenyl bis (diethylene glycol) phosphite to produce tetrakis (diethylene glycol) tetrachloro (Bisphenol A) diphosphite.

Example 26

The procedure of Example 22 was repeated replacing the phenyl bis (dipropylene glycol) phosphite by 2 moles of phenyl bis (polypropylene glycol 2025) phosphite to produce tetrakis (diethylene glycol) tetrachloro (Bisphenol A) diphosphite.

Example 27

2 moles of 50% aqueous hydrogen peroxide were stirred into 1 mole of tetrakis (dipropylene glycol) tetrachloro (Bisphenol A) diphosphite. After reaction was complete, the water was distilled off leaving a liquid residue of tetrakis (dipropylene glycol) tetrachloro (Bisphenol A) diphosphate.

Example 28

To 1 mole of tetrakis (dipropylene glycol) tetrachloro (Bisphenol A) disphosphite there was added 2 moles of sulfur. The mixture was heated to 130° C. until reaction was complete. The product was tetrakis (dipropylene glycol) tetrachloro (Bisphenol A) dithiophosphate.

Example 29

1 mole of tetrakis (dipropylene glycol) tetrachloro (Bisphenol A) diphosphite was heated with 5 mole percent of n-butyl bromide at 125–135° C. for 10 hours. Volatile material was stripped off at 150° C. and 10 mm. The liquid residue was essentially bis (hydroxypropoxypropane) bis (dipropylene glycol) tetrachloro (Bisphenol A) diphosphonate.

As has been set forth previously the phosphite, phosphate, thiophosphate and phosphonate products of the present invention are specially useful in preparing polyurethanes. It has been observed for example that the products of the present invention, particularly those containing a tri to pentahalophenyl group (as well as those which are tetrahaloisopropylidenediphenol derivatives), have outstanding resistance to burning. Thus a polyurethane made from toluene diisocyanate and 2,4,6-trichlorophenyl bis (dipropylene glycol) phosphite would not burn when subjected to a flame in either the vertical or horizontal position. This was true even when a portion of the 2,4,6-trichlorophenyl bis (dipropylene glycol) phosphite was replaced in part by a less flame resistant polyol.

The phosphites, phosphates, thiophosphates and phosphonates can be the sole hydroxyl reactant present or they can be used in admixture with other polyhydroxy compounds (polyols) in forming the polyurethanes. Foamed polyurethanes can be obtained by adding water prior to or simultaneously with the addition of the polyisocyanate.

Alternatively, foams can be prepared by uniformly distributing a liquefied halogen substituted alkane containing at least one fluorine atom in its molecule and having a boiling point at one atmosphere pressure not higher than 80° F. and preferably not lower than −60° F. in either the phosphite (or mixture of phosphite and other polyhydroxy compound) reactant or the polyisocyanate reactant and then mixing the reactants and permitting the temperature of the mixture to rise during the ensuing reaction above the boiling point of the liquefied gas to produce a porous polyurethane. Such fluorine containing compounds include dichlorodifluoromethane, dichloromonofluoromethane, chlorodifluoromethane, and dichlorotetrafluoroethane. The foams can be formed with such fluorine containing compounds in the manner described in General Tire British Patent 821,342.

Foamed polyurethanes can be made by either the one shot or two step procedures. In the case of the reaction of phosphites having a hydroxyl number above 125 in order to form a good, flexible foam it is often desirable to employ the two step procedure unless an additional polyhydroxy reactant is added to lower the hydroxyl number of the hydroxy reactants to below 125 and preferably below 100, e.g., as low as 25, but preferably at least 35.

In preparing urethane foams according to the invention a rigid foam is made utilizing a polyol phosphite of the type set forth supra (or mixture of such phosphite and another polyhydroxy containing compound) having a hydroxyl number of 350–750; a semi-rigid foam is prepared if the hydroxyl number is 75–350, and a flexible foam is prepared if the hydroxyl number is 35–75.

The polyurethanes prepared according to the present invention are solids. They have good flame-proofing properties and in the foamed form are useful as linings for textiles, e.g., coats, suits and dresses, insulation in building construction, upholstery filling material, pillows, hair curlers, brushes, carpet underlays or backings, shock absorbent filling for packages, shoes, etc.

The unfoamed polyurethane products are useful wherever elastomeric polyurethanes can be employed with the advantage of improved flame and fire resistance. The elastomers in thread form can be employed in making girdles. The unfoamed polyurethanes are suitable for molding cups and other articles, and as protective coatings for steel, wood and glass and as adhesives.

As examples of organic polyisocyanates which can be used to make the polyurethanes there can be employed toluene-2,4-diisocyanate; toluene-2,6-diisocyanate; 4-methoxy-1,3-phenylene diisocyanate; diphenyl methane-4,4'-diisocyanate; 4-chloro-1,3-phenylene diisocyanate; 4-isopropyl-1,3-phenylene diisocyanate; 2,4-diisocyanato-diphenylether; 3,3' - dimethyl - 4,4'-diisocyanato diphenyl methane; mesitylene diisocyanate; durylene diisocyanate; 4,4'-methylene bis (phenylisocyanate); benzidine diisocyanate; 4,4'-diisocyanato dibenzyl; 3,3'-bitolylene-4,4'-diisocyanate; 1,5-naphthylene diisocyanate; tetramethylene diisocyanate; hexamethylene diisocyanate; decamethylene diisocyanate; toluene-2,4,6-triisocyanate; tritolylmethane triisocyanate, 2,4,4'-triisocyanato diphenyl ether; phenylene diisocyanate; o-, m- and p-xylene diisocyanates. The reaction product of toluene diisocyanate with trimethylolpropane at an NCO/OH ratio of 2:1, (Mondur CB); the the reaction product of toluene diisocyanate with 1,2,6-hexanetriol at an NCO/OH ratio of 2:1; the reaction product of toluene diisocyanate with a polyol phosphite at an NCO/OH ratio of 2:1, e.g., when the polyolphosphite is dipropylene glycol tetrol diphosphite or tris (dipropylene glycol) phosphite or 2,4,6-trichlorophenyl bis (dipropylene glycol) phosphite; as well as polyisocyanates listed in Siefken (Annalen Vol. 562, pages 122–135, 1949).

There can also be used polymethylene polyphenylisocyanate molecular weight 380 to 400, having an isocyanate equivalent of 135 (maximum), a viscosity of 400 centipoises (maximum) at 25° C., a NCO content of 31% (minimum), an acid value (p.p.m. of H⁺) of 200 (maximum). This material is sold commercially under the trademark PAPI. There can also be used bitolylene diisocyanate (TODI) and dianisidine diisocyanate (DADI).

PAPI is particularly useful in forming rigid polyurethane foams as is toluene diisocyanate.

Alternatively, as the polyisocyanate there can be used prepolymers made by reacting one or more of the above polyisocyanates with a polyhydroxy compound such as a polyester having terminal hydroxyl groups, a polyhydric alcohol, glycerides, hydroxy containing glycerides, etc. The prepolymers should have terminal isocyanate groups. To insure this it is frequently desirable to employ an excess of 5% or more of the polyisocyanate in forming the prepolymer.

Typical examples of such prepolymers having isocyanate end groups are those formed from toluene diisocyanate and polyhydroxy compounds. Unless otherwise indicated, in the illustrative examples a mixture of 80% 2,4-isomer and 20%, 2,6-isomer of toluene diisocyanate was employed in making the prepolymer. Thus, there can be used the prepolymers from toluene diisocyanate and castor oil, toluene diisocyanate and blown tung oil (or blown linseed oil or blown soya oil), toluene diisocyanate and the polyester of ethylene glycol, propylene glycol and adipic acid having a molecular weight of 1900 described in Example I of Kohrn Patent 2,953,839, as well as the isocyanate terminated prepolymers in Examples II–VIII, inclusive, of the Kohrn patent, toluene diisocyanate and polytetramethylene glycol (1000 molecular weight), toluene diisocyanate and polypropylene glycol (molecular weight 2025), toluene diisocyanate and dipropylene glycol, toluene diisocyanate and polypropylene glycol (molecular weight 1025), toluene diisocyanate and LG–56 (glycerine-propylene oxide adduct having a molecular weight of 3000), toluene diisocyanate and 1,2,6-hexanetriol-propylene oxide adducts having molecular weights of 500, 700, 1500, 2500, 3000 and 4000, hexamethylene diisocyanate and pentaerythritol, toluene diisocyanate and polyethylene sebacate, toluene diisocyanate and a mixture of 98% polypropylene glycol (molecular weight 1900) with 2% 1,2,6-hexanetriol, toluene diisocyanate and a copolymer of ethylene oxide and propylene oxide having a molecular weight of 2020, toluene diisocyanate and glyceryl adipate phthalate polymer, toluene diisocyanate and a mixture of polypropylene ether glycol molecular weight 995 and castor oil as described in Example 2 of Kane Patent 2,955,091, as well as the other prepolymers set forth in Examples 1 and 3-11 of Kane, toluene diisocyanate and polypropylene ether glycol (molecular weight 1800) of Example I of Swart Patent 2,915,496 and the prepolymers of Examples II, III, VI and VIII of the Swart patent. Toluene diisocyanate and tris (dipropylene glycol) phosphite; toluene diisocyanate and tris (polypropylene glycol 2025) phosphite.

As previously stated the polyol phosphites, phosphates, thiophosphates and phosphonates of the present invention can be the sole hydroxyl reactant present or they can be used in admixture with other polyhydroxy compounds in forming the polyurethanes. Examples of such compounds are polyethylene glycols having molecular weights of 400 to 3000; polypropylene glycols having molecular weights of 400 to 3000; ethylene glycol; diethylene glycol; triethylene glycol; propylene glycol; dipropylene glycol; tripropylene glycol; thiodiglycol; glycerol; trimethylolethane; trimethylolpropane; ether triols from glycerine and propylene oxide having molecular weights of 1000 and 3000, ether containing triols from 1,2,6-hexane triol and propylene oxide having molecular weights of 750, 1500, 2400 and 4000; sorbitol-propylene oxide adduct molecular weight 1000; pentaerythritol-propylene oxide adduct molecular weight 1000; trimethylolphenol; octakis (2-hydroxypropyl) sucrose, pentaerythritol; castor oil; blown linseed oil; blown soya oil; N,N,N′,N′-tetrakis (2-hydroxypropylene) ethylene diamine; mixed ethylene glycol-propylene glycol adipate resin molecular weight 1900; polyneopentylene sebacate; reaction product of 1 mole of trimethylolpropane with 3000 to 12,000 molecular weight units of 1,4-butanediol adipic acid polyester; oxypropylated p-tert. butylphenol-formaldehyde resin of Example 2b of De Groote United States Patent 2,499,365; tris (dipropylene glycol) phosphite; tris (polypropylene glycol 2025) phosphite; dipropylene glycol tetrol diphosphite; dipropylene glycol hydroxypropoxypropane phosphonate; penta hydroxyethyl dextrose; bis polypropylene glycol 2025 ester of hydroxypolypropoxypropane phosphonic acid (wherein the hydroxypolypropoxypropane group has a molecular weight of about 2025); bis diethylene glycol ester of hydroxyethoxyethane phosphonic acid, bis tripropylene glycol ester of butanephosphonic acid.

From 5 to 100% by weight of the hydroxyl component can be the phosphite of Formula I or II (or the corresponding phosphate, thiophosphate or phosphonate).

The polyol phosphites also can be employed as light stabilizers for polyurethane resins made from any of the non phosphite containing polyols set forth above. For such use the polyol phosphite is employed in an amount of from 0.1-15% by weight of the polyol, e.g. 2.5% by weight of 2,4,6-trichlorophenyl bis (dipropylene glycol) phosphite is added to 14.4 grams of LG–56 (glycerine-propylene oxide adduct molecular weight 3000) and there is added 5.2 grams of toluene diisocyanate and 0.37 gram of water to form a light stable foamed polyurethane. The phosphites of the invention not only act to stabilize the non phosphite containing polyol employed as well as the polyurethane product but also serve as reactants.

In preparing the cured and/or foamed polyurethanes any of the conventional catalysts can be employed, e.g. sodium hydroxide, sodium methylate, sodium phenolate, tertiary amines, (e.g. N-methyl morpholine, N-ethyl morpholine, 1,2,4-trimethylpiperazine) trimethyl amine, triethyl amine, tributyl amine and other trialkyl amines. The esterification product of 1 mole of adipic acid and 2 moles of diethyl ethanolamine, triethyl amine citrate, 3 - morpholino-propionamide, 2 - diethylaminoacetamide, triethylene diamine, N,N,N′,N′ - tetrakis (2 - hydroxypropyl) ethylene diamine, tribenzyl amine, N,N′-dimethylpiperazine, N,N - dimethyl hexahydroaniline, 2,2,1-diazabicyclooctane, 1,2-dimethylimidazole, arsenic trichloride, antimony pentachloride, titanium tetrachloride, dioctyl lead diacetate, octylene glycol titanate. There can also be used tin compounds having at least one direct carbon to tin valence bond, e.g. hydrocarbon tin acylates such as dibutyltin dilaurate, dibutyltin dioctoate, tributyltin monolaurate, dimethyltin diacetate, dibutyltin maleate, hydrocarbon tin alkoxides, e.g. dibutyltin diethoxide and dibutyltin dimethoxide, octyl stannoic acid, trimethyltin hydroxide, trimethyltin chloride, triphenyltin hydride, triallyltin chloride, tributyltin fluoride, dibutyltin dibromide, bis (carboethoxymethyl) tin diiodide, tributyltin chloride, trioctyltin acetate, butyltin trichloride, octyltin tris (thiobutoxide), dimethyltin oxide, stannous octanoate, dioctyltin oxide, diphenyltin oxide, stannous oleate as well as the other tin compounds set forth in Hostettler French Patent 1,212,252 and Barnes United States Patent 3,022,256.

There can also be used a small amount, e.g. 0.001 to 10% by weight of the total ingredients of a stabilizing or thickening agent, e.g. methoxylated cellulose, ethyl cellulose, hydroxyethyl cellulose, benzyl cellulose, cellulose acetate, cellulose acetate-butyrate, hydroxyethyl polyvinyl alcohol, polyvinyl chloride, polymerized methyl methacrylate.

Fillers can be added in amounts up to 20% by weight, e.g. clay, diatomaceous earth, powdered aluminum and beryllium, vermiculite, cork, bark, foamed polystyrene, foamed polyethylene and foamed polypropylene can be used.

Conventional surfactants can be added in an amount of 0.1–5% by weight of the composition. Preferably less than 1%, e.g. 0.2% of surfactant is employed. The preferred surfactants are silicones, e.g. polydimethyl siloxane having a viscosity of 3 to 1000 centistokes, trimethoxydimethyl polysiloxane molecular weight 850 copolymerized with a dimethoxypolyethylene glycol of molecular weight 750 as well as any of the other siloxanes disclosed in Hostettler French Patent 1,212,252 and the siloxane-oxyalkylene copolymers having from about 10 to 80% by weight of siloxane polymer and from 90 to 20% by weight of alkylene oxide polymer such as the copolymers described in United States Patent 2,834,748.

Unless otherwise indicated, all parts and percentages are by weight.

In the following examples, unless otherwise indicated, when toluene diisocyanate was employed it was a mixture of 80% of the 2,4-isomer and 20% of the 2,6-isomer.

In preparing one shot foams in the examples there was utilized the following standard formulation:

| | Gram |
|---|---|
| Water | 0.37 |
| Dibutyltin dilaurate | 0.07 |
| Polydimethyl siloxane (50 centistokes grade) | 0.12 |
| N-ethyl morpholine | 0.1 |
| Polyol, as indicated. | |

This mixture is designated in the examples as Formulation A.

Foams were made by adding Formulation A to 5.2 grams of the toluene diisocyanate. The foams were then cured in a 110° C. oven for about 20 minutes.

Example 30

The polyol used in Formulation A was 4.6 grams of 2,4,6-tribromophenyl bis (dipropylene glycol) phosphite. Upon addition of 5.2 grams of toluene diisocyanate there was produced a solid foam which was non burning.

Example 31

The polyol used in Formulation A was 3.5 grams of 2,4,6-trichlorophenyl bis (dipropylene glycol) phosphite. Upon addition of 5.2 grams of toluene diisocyanate there was produced a solid foam which was non burning.

Example 32

The polyol used in Formulation A was 4 grams of pentachlorophenyl bis (dipropylene glycol) phosphite. Upon addition of 5.2 grams of toluene diisocyanate there was produced a solid foam which was non burning.

Example 33

The polyol used in Formulation A was 3.5 grams of tetrakis (dipropylene glycol) tetrachloro (Bisphenol A) diphosphite. Upon addition of 5.2 grams of toluene diisocyanate there was produced a solid non burning foam.

Example 34

The polyol used in Formulation A was 3.4 grams of 2,4,6-trichlorophenyl bis (dipropylene glycol) phosphate. Upon addition of 5.2 grams of toluene diisocyanate there was produced a solid non burning foam. A similar result was obtained by replacing the 2,4,6-trichlorophenyl (dipropylene glycol) phosphate by 2,4,6-trichlorophenyl (dipropylene glycol) thiophosphate.

Example 35

The polyol used in Formulation A was 3.5 parts of 2,4,6-trichlorophenyl dipropylene glycol hydroxypropoxypropane phosphonate. Upon addition of 5.2 grams of toluene diisocyanate there was produced a solid foam which was non burning.

Example 36

The polyol used in Formulation A was a mixture of 1.8 grams of 2,4,6-trichlorophenyl bis (dipropylene glycol) phosphite and 7 grams of LG-56 (glycerine-propylene oxide adduct molecular weight 3000). Upon addition of 5.2 grams of toluene diisocyanate there was produced a solid non burning foam.

Example 37

The polyol used in Formulation A was a mixture of 2 grams of pentachlorophenyl bis (dipropylene glycol) phosphite and 7 grams of polypropylene glycol molecular weight 2025. Upon addition of 7.5 grams of 4,4'-diphenylmethane diisocyanate there was produced a solid foam which was non burning.

In the following examples there was employed Formulation B which consisted of

| | Grams |
|---|---|
| Polyol, as indicated. | |
| Polydimethyl siloxane (50 centistokes) | 1 |
| Dibutyltin dilaurate | 0.03 |
| Tetramethylbutane diamine | 1.5 |
| Trichlorofluoromethane | 37.5 |

Example 38

The polyol used in Formulation B was a mixture of 46 grams of octakis (2-hydroxypropyl) sucrose (molecular weight 800, hydroxyl No. 560) and 105 grams of 2,4,6-trichlorophenyl bis (dipropylene glycol) phosphite. The mixture was kept at 15° C. and there was added 118.5 grams of 4,4'-diphenylmethane diisocyanate. An exothermic reaction ensued to form a solid, non burning foam.

Example 39

The polyol used in Formulation B was a mixture of 67 grams of octakis (2-hydroxypropyl) sucrose (hydroxyl No. 560) and 54.4 grams of 2,4,6-trichlorophenyl dipropylene glycol hydroxypropoxypropane phosphonate. This mixture was kept at 15° C. and there was added 81.8 grams of toluene diisocyanate. An exothermic reaction ensued to form a solid, non burning foam.

Example 40

The polyol used in Formulation B was a mixture of 67 grams of octakis (2-hydroxypropyl) sucrose (hydroxyl No. 560), 27.1 grams of 2,4,5-trichlorophenyl bis (dipropylene glycol) phosphite and 15.7 grams of bis (dipropylene glycol) hydroxypropoxypropane phosphonate. This mixture was kept at 15° C. and there was added 118.5 grams of 4,4'-diphenylmethane diisocyanate. An exothermic reaction ensued to form a solid, non burning foam. Similar results were obtained when the 2,4,5-trichlorophenyl bis (dipropylene glycol) phosphite was replaced by 27.2 grams of 2,4,6-trichlorophenyl bis (dipropylene glycol) phosphate.

Example 41

The polyol used in Formulation B was a mixture of 67 grams of octakis (2-hydroxypropyl) sucrose (hydroxyl No. 560) and 53.5 grams of tetrakis (dipropylene glycol) tetrachloro (Bisphenol A) diphosphite. This mixture was kept at 15° C. and there was added 118.5 grams of 4,4'-diphenylmethane diisocyanate. An exothermic reaction ensued to form a solid, non burning foam. A similar result was obtained when the tetrakis (dipropylene glycol) tetrachloro (Bisphenol A) diphosphite was replaced by 53.5 grams of bis (hydroxypropoxypropane) bis (dipropylene glycol) tetrachloro (Bisphenol A) diphosphonate or by 53.5 grams of tetrakis (dipropylene glycol) tetrachloro (Bisphenol A) diphosphate.

PERTINENT ART

Lanham—2,909,559; discloses alkylene glycol bis (2,4-dichlorophenyl) phosphate, and polyalkylene glycol bis (2,4-dichlorophenyl) phosphate.

Hurdis—2,891,985; discloses lower alkyl bis (tetrachlorobisphenol A diethanol) phosphate.

Toy—2,643,265; discloses bis (dialkyl phosphate) ester of tetrachlorobisphenol A.

Weisel—2,542,604; discloses tris (pentachlorophenyl) phosphate and alkyl bis (pentachlorophenyl) phosphate.

Bereim—3,046,296; discloses φ-pentachlorophenyl di lower alkyl thiophosphate.

Renner—3,081,333; discloses pentachlorophenoxy (1)-propanol (2)-phosphonic acid di lower alkyl ester (as well as the corresponding di, tri and tetrachloro or bromo phenyl compounds).

Harris—2,828,198; discloses tris (2,4,5 - trichlorophenoxyethyl) phosphite.

Tolkmith—2,668,841; discloses O-ethyl o-(2,4,5-trichlorophenyl) methane phosphonate.

Moyle—2,599,515; discloses di lower alkyl 2,4,5-trichlorophenyl phosphate.

Drake—2,599,375; discloses di lower alkyl 2,4,6-trichlorophenyl phosphate.

Turbak—3,072,618; discloses tris (2,4-dichloro-phenyl) phosphite and the corresponding phosphate.

Hechenbleikner—2,834,798; discloses several tris (dichlorophenyl) phosphites.

Moyle—2,170,833; discloses diaryl 2,4-dichloro-phenyl phosphite.

Hechenbleikner—3,147,297; discloses tris (2,4,5-trichloro-phenyl) phosphite.

Friedman—3,142,651; discloses bis dipropylene glycol ester of 4-chlorophenyl phosphonic acid.

What is claimed is:
1. A member of the group consisting of phosphates and thiophosphates having a formula selected from the group consisting of

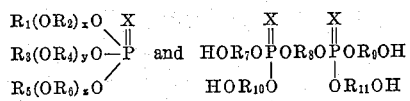

where $R_1$ is a polyhalophenyl group wherein the halogen atoms have an atomic weight of 35 to 80; $R_3$ and $R_5$ are hydroxyalkyl; $R_2$ is alkylene; $R_4$ and $R_6$ are selected from the group consisting of alkylene and hydroxyalkylene; $x$, $y$ and $z$ are selected from the group consisting of zero and a positive integer; $R_7$, $R_9$, $R_{10}$ and $R_{11}$ are selected from the group consisting of alkylene, alkyleneoxy - alkylene and alkylenepoly(oxyalkylene); $R_8$ is a ring polyhalo substituted alkylidene bisphenol from which the hydroxyl hydrogens have been removed, the halogen atoms having an atomic weight of 35 to 80 and the alkylidene group has 1 to 9 carbon atoms; and X is a chalcogen of atomic weight from 16 to 32 inclusive.

2. A polyhalophenyl bis (poly lower alkylene glycol) thiophosphate wherein the halogen atoms have an atomic weight of 35 to 80.

3. A polyhalophenyl bis (polypropylene glycol) thiophosphate wherein the halogen atoms have an atomic weight of 35 to 80 and there are 3 to 5 halogen atoms in the polyhalophenyl group.

4. A polyhalophenyl bis (dipropylene glycol) thiophosphate wherein the halogen atoms have an atomic weight of 35 to 80 and there are 3 to 5 halogen atoms in the polyhalophenyl group.

5. A tetrakis (poly lower alkylene glycol) tetrahalo alkylidene diphenol dithiophosphate wherein the halogen atoms are ring substituted and have an atomic weight of 35 to 80 and the alkylidene group has 1–9 carbon atoms.

6. A tetrakis (poly lower alkylene glycol) tetrahalo isopropylidene diphenol dithiophosphate.

7. A tetrakis (polypropylene glycol) tetrahalo isopropylidene diphenol dithiophosphate wherein the halogen atoms are ring substituted and have an atomic weight of 35 to 80.

8. Tetrakis (dipropylene glycol) 2,6,2',6' - tetrachloro isopropylidene diphenol dithiophosphate.

9. A polyhalophenyl bis (poly lower alkylene glycol) phosphate wherein the halogen atoms have an atomic weight of 35 to 80.

10. A trihalophenyl bis (poly lower alkylene glycol) phosphate wherein the halogen atoms have an atomic weight of 35 to 80.

11. A trihalophenyl bis (polypropylene glycol) phosphate wherein the halogen atoms have an atomic weight of 35 to 80.

12. A trihalophenyl bis (dipropylene glycol) phosphate wherein the halogen atoms have an atomic weight of 35 to 80.

13. A pentahalophenyl bis (poly lower alkylene glycol) phosphate wherein the halogen atoms have an atomic weight of 35 to 80.

14. A pentahalophenyl bis (polypropylene glycol) phosphate wherein the halogen atoms have an atomic weight of 35 to 80.

15. A pentahalophenyl bis (dipropylene glycol) phosphate wherein the halogen atoms have an atomic weight of 35 to 80.

16. A tetrakis (poly lower alkylene glycol) tetrahalo alkylidene diphenol diphosphate wherein the halogen atoms are ring substituted and have an atomic weight of 35 to 80 and the alkylidene group has 1 to 9 carbon atoms.

17. A tetrakis (poly lower alkylene glycol tetrahalo isopropylidene diphenol diphosphate wherein the halogen atoms are ring substituted and have an atomic weight of 35 to 80.

18. A tetrakis (polypropylene glycol) tetrahalo isopropylidene diphenol diphosphate wherein the halogen atoms are ring substituted and have an atomic weight of 35 to 80.

19. Tetrakis (dipropylene glycol) 2,6,2',6'-tetrachloro isopropylidene diphenol diphosphate having the formula

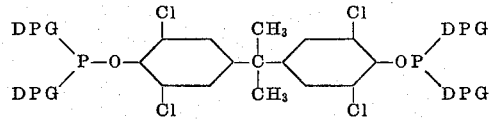

where DPG stands for dipropylene glycol with one hydroxyl hydrogen removed.

20. A polyhalophenoxy lower alkyl bis (poly lower alkylene glycol) phosphate wherein there are 3 to 5 halogen atoms of atomic weight 35 to 80 in the polyhalophenoxy group.

21. Tetrakis (dipropylene glycol) 2,6,2',6'-tetrabromo isopropylidene diphenol diphosphate.

References Cited
UNITED STATES PATENTS 2,643,265   6/1953   Toy _____ 260—930
3,061,625   10/1962  Friedman _____ 260—953

CHARLES B. PARKER, Primary Examiner.

A. SUTTO, Assistant Examiner.